(12) United States Patent
Mampaey

(10) Patent No.: US 7,963,440 B2
(45) Date of Patent: Jun. 21, 2011

(54) PAYMENT METHOD, A RELATED USER TERMINAL, A RELATED VENDOR TERMINAL, A RELATED DELIVERY-COMPANY TERMINAL AND A RELATED RETAILER TERMINAL

(75) Inventor: Marcel Joseph Louis Mampaey, Brussels (BE)

(73) Assignee: Alcatel, Paris (FR)

( * ) Notice: Subject to any disclaimer, the term of this patent is extended or adjusted under 35 U.S.C. 154(b) by 1667 days.

(21) Appl. No.: 11/004,999

(22) Filed: Dec. 7, 2004

(65) Prior Publication Data

US 2005/0127175 A1 Jun. 16, 2005

(30) Foreign Application Priority Data

Dec. 16, 2003 (EP) ..................................... 03293173

(51) Int. Cl.
*G06K 15/00* (2006.01)
(52) U.S. Cl. .......................................... 235/383; 705/35
(58) Field of Classification Search ................... 235/383, 235/379, 380, 385; 705/26, 35, 40
See application file for complete search history.

(56) References Cited

U.S. PATENT DOCUMENTS

| | | | | |
|---|---|---|---|---|
| 6,332,134 B1 * | 12/2001 | Foster | .......................... | 705/36 R |
| 6,934,692 B1 * | 8/2005 | Duncan | ............................ | 705/35 |
| 2001/0032180 A1 | 10/2001 | Takami et al. | | |
| 2001/0047273 A1 * | 11/2001 | Greer et al. | ......................... | 705/1 |
| 2001/0056395 A1 | 12/2001 | Khan | | |
| 2002/0040350 A1 * | 4/2002 | Shinzaki | .......................... | 705/74 |
| 2002/0065774 A1 * | 5/2002 | Young et al. | ..................... | 705/41 |
| 2002/0120582 A1 * | 8/2002 | Elston et al. | ..................... | 705/64 |
| 2003/0046106 A1 | 3/2003 | Tsunoda | | |
| 2003/0212631 A1 * | 11/2003 | Foth et al. | ......................... | 705/40 |
| 2005/0055319 A1 * | 3/2005 | Monsen et al. | ............... | 705/401 |

FOREIGN PATENT DOCUMENTS

| | | | |
|---|---|---|---|
| EP | 1 276 083 A1 | | 1/2003 |
| EP | 1533726 A1 * | | 5/2005 |
| WO | WO 00/52555 A1 | | 9/2000 |
| WO | WO 02/07051 A1 | | 1/2002 |
| WO | WO 03/094491 A1 | | 11/2003 |

\* cited by examiner

*Primary Examiner* — Seung H Lee
(74) *Attorney, Agent, or Firm* — Sughrue Mion, PLLC

(57) ABSTRACT

The present invention relates to a payment method. A user terminal sends a request for ordering a good to a vendor-terminal. The vendor-terminal sends a shipping order, to a delivery company-terminal of a deliverer. The user-terminal confirms the acceptance of the ordered goods by creating an approval for payment destined to the vendor terminal and forwards the approval towards the vendor terminal. The vendor-terminal upon reception of the approval, requests money required for paying for the goods from the bank account of the buyer by forwarding the approval towards the retailer terminal. The retailer forwards a proof of transferring the money from the bank account of the buyer to a bank account of the vendor in response to receipt of the approval. The vendor terminal, upon reception of the proof of transferring the money, notifies the delivery company terminal of acceptance of the goods and the successful payment.

16 Claims, 3 Drawing Sheets

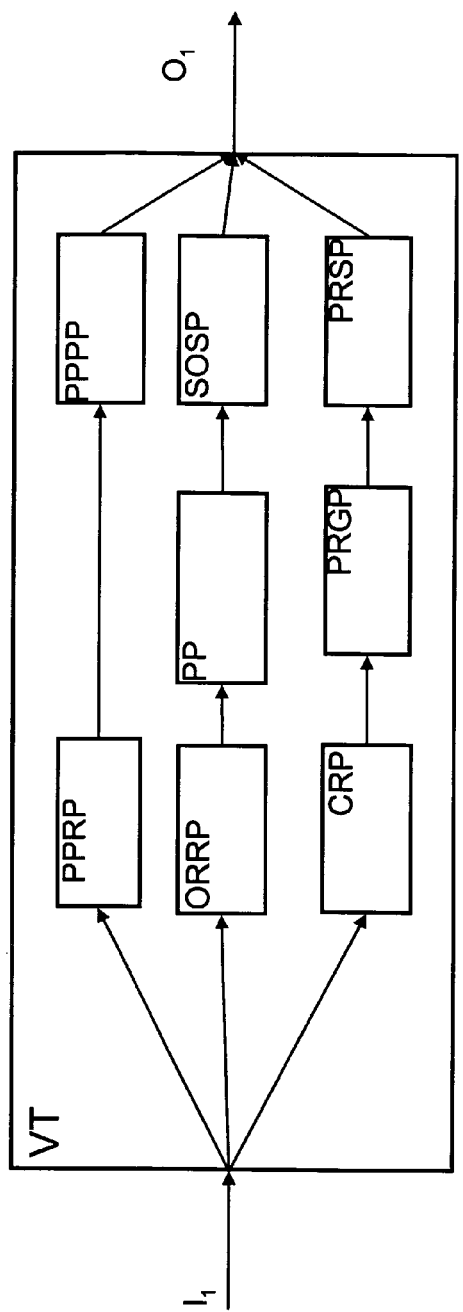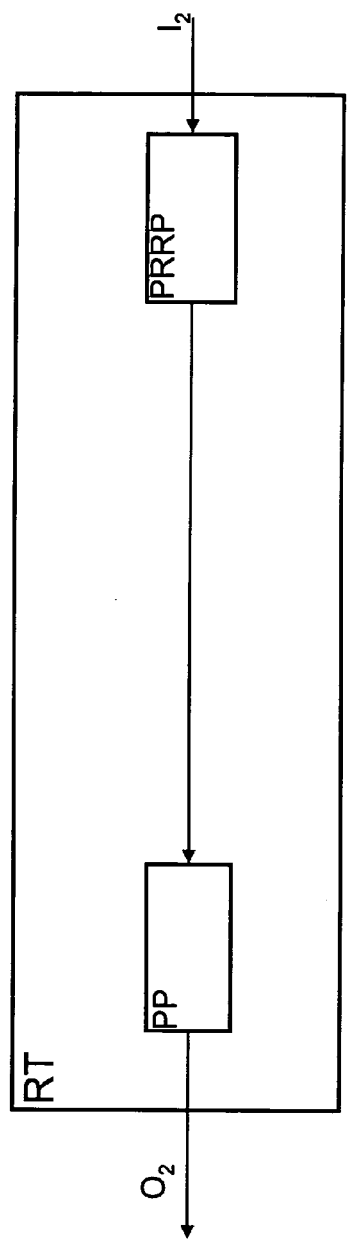
FIG. 2
FIG. 3

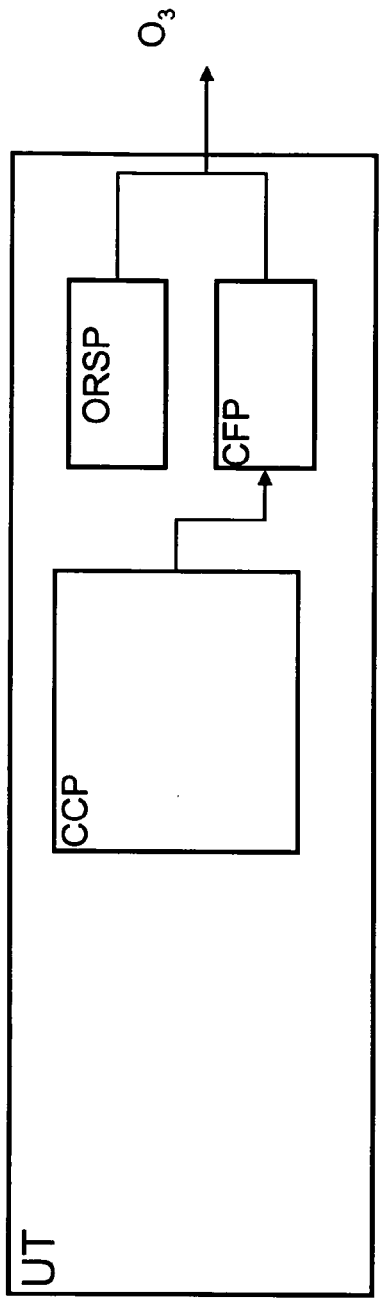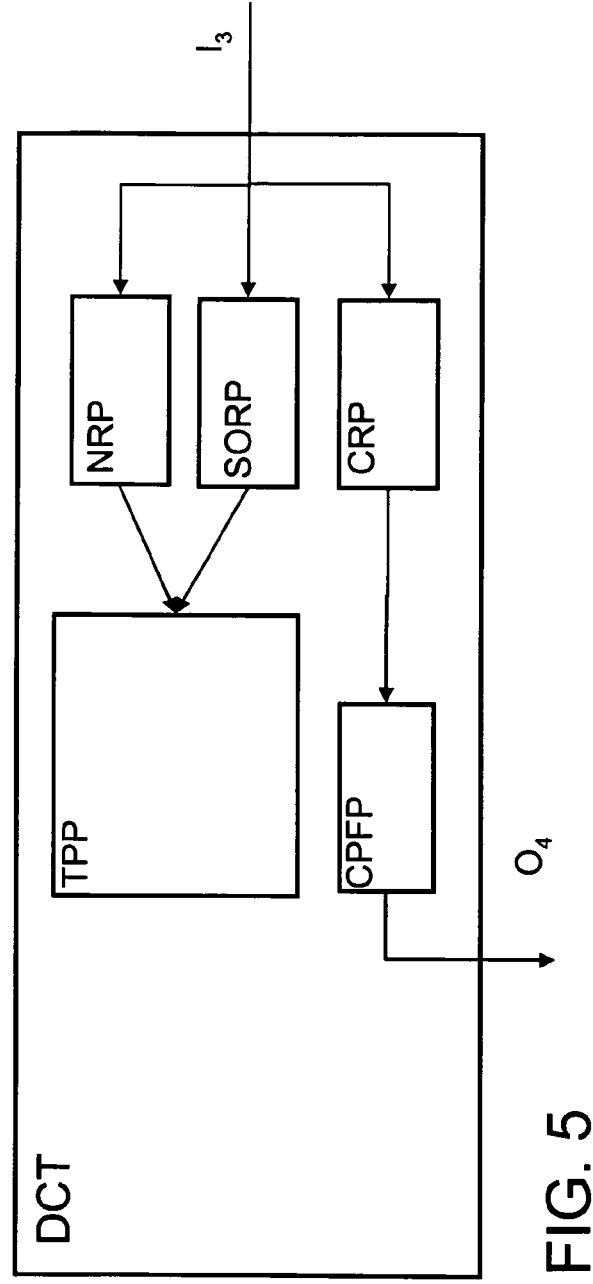

PAYMENT METHOD, A RELATED USER TERMINAL, A RELATED VENDOR TERMINAL, A RELATED DELIVERY-COMPANY TERMINAL AND A RELATED RETAILER TERMINAL

BACKGROUND OF THE INVENTION

The present invention relates to a payment method as described in the preamble of claim 1, the user terminal as described in preamble of claim 9, the vendor terminal as described in preamble of claim 11, the delivery company-terminal as described in claim 12, and the retailer terminal as described in preamble of claim 15. Such a payment method and related devices are generally known in the art. Indeed, in e-commerce, payment methods exist for paying goods that are electronically ordered at a vendor-site by a user using a terminal.

Such a vendor-site consists of at least a vendor-terminal, this site being maintained by a vendor. A buyer may for instance select a good from a Web site maintained by the vendor. The electronic ordering of the selected goods by the buyer in such an e-commerce payment method then is done via a buyer's user terminal sending a request for ordering a good, to the vendor-terminal via the Internet. Alternatively, the ordering for instance may also be done by telephone and subsequently confirmed by mail or fax.

At the same time of sending the order, credit card information or other information for enabling the immediate payment of the ordered good is sent towards the vendor terminal. The vendor then may retrieve the money due for the ordered good using this credit card information. If the payment transaction is successful, the vendor sends the good(s) via a shipping company to the buyer. The shipping company delivers the good at the buyer's address of convenience, for instance the home address of the buyer. The buyer may accept the good if the state of the good is satisfying, if the right product is delivered, etc.

In case the ordered good is not delivered at all, damaged, or is not the right product, it is often difficult for the buyer to get back the money already paid.

Today's e-commerce solutions involve immediate payment using a credit card or a pre-paid card for paying at the same instant of ordering of goods. The payment can also be performed by a user-preferred entity called retailer and that maintains a user's bank-account on behalf of the user. However, it is not possible to pay the goods only at delivery while still guaranteeing to all involved parties that they will receive their money. Some payment on delivery solutions exist but they are either manual (not electronic) and involve a significant extra cost (postal services), or electronic but only available to large vendors performing the delivery themselves (not via a third party) and using proprietary electronic payment solutions only available locally (not internationally). These solutions are too costly for the majority of vendors and in any case not available for international electronic commerce.

An object of the present invention is to provide an electronic payment method and related devices of the above known type but wherein the payment is performed at delivery of the ordered while guaranteeing all involved parties that they will obtain their money.

According to the invention, this object is achieved by the payment method as described in claim 1, the user terminal as described in claim 9, the vendor terminal as described in claim 11, the delivery company terminal as described in claim 12 and the retailer terminal as described in claim 15. Indeed, creating an approval for payment by the user terminal, destined to the vendor terminal and forwarding this approval towards the vendor terminal, enables the vendor-terminal upon reception of this approval for payment, to request the amount of money required for paying the good from the bank account of the buyer by forwarding the approval for payment towards the retailer terminal. The retail terminal subsequently forwards a proof of transferring the amount of money from the bank-account of the buyer to a bank-account of the vendor in response to receipt of the approval for payment. The vendor terminal, upon reception of the proof of transferring the amount of money, notifies the delivery company terminal of the successful payment.

SUMMARY OF THE INVENTION

In this way all involved parties do have proof of each of the mutually accepted agreements and intermediate agreements made.

An additional advantage of the present invention is that it is available to users with commonly available user terminals such as for example (but not limited to) mobile GPRS telephones or Personal Digital Assistants with GPRS-airlink, as long as the user terminal supports a commonly used technology for signing electronic documents.

Another additional advantage of the present invention is that it can be used by most vendors, including small ones, as the tasks that are essential to the vendor in the present invention do not require that a complex infrastructure is added to the vendor terminal.

Another characteristic feature of the present invention is described in claim 2 and claim 10.

The user terminal alternatively may forward the approval for payment towards the vendor terminal via the delivery company terminal.

Another characteristic feature of the present invention is described in claim 3.

The vendor-terminal is further adapted to send a confirmation of the request for ordering the good at reception of the request for ordering the good, towards the user-terminal in order to notify the user that the order is received well and is currently being dealt with.

A further characteristic feature of the present invention is described in claim 4

The vendor terminal, at sending the shipping order to a delivery company-terminal, additionally is adapted to send an invoice towards the delivery company-terminal. The delivery company terminal is adapted to send an invoice towards the user terminal at delivery of the goods.

A further characteristic feature of the present invention is described in claim 5.

The vendor terminal, at sending the shipping order to a delivery company-terminal, additionally is adapted to send an invoice towards the user terminal.

A further characteristic feature of the present invention is described in claim 6.

At reception of the confirmation of the request for ordering the good, the user-terminal may request a retailer-terminal to provide the vendor-terminal with a proof of credit available on the bank account of the user, whereupon the retailer-terminal may forward the proof of credit available required for paying the good to the user-terminal and subsequently the user-terminal may forward the proof of credit available to the vendor-terminal.

A further characteristic feature of the present invention is described in claim 7.

Alternatively, the user-terminal may, at reception of the confirmation, request a retailer-terminal to provide the vendor-terminal with a proof of credit available on said bank account, required for paying said good, whereupon the retailer-terminal may forward the proof of credit available to the vendor-terminal.

A further characteristic feature of the present invention is described in claim 8.

The approval for payment is an acknowledged invoice that is created by acknowledging the invoice received from the vendor terminal or the delivery company terminal.

Another characteristic feature of the present invention is described in claim 13.

The delivery company-terminal further comprises a notification reception part that is adapted to receive a notification of acceptance of the goods by the user forwarded by the vendor terminal. At the reception of this notification the deliverer is informed that the goods are accepted by the user, payment is made, and delivery is authorised so that he may leave the goods with the buyer.

Another feature of the present invention is described in claim 14.

A delivery company-terminal comprises a notification reception part that is adapted to receive a notification of acceptance of the goods by the user forwarded by the vendor terminal. At the reception of this notification the deliverer is informed that the delivery is accepted, payment is arranged so that he may leave the goods with the buyer.

An additional characteristic feature of the present invention is described in claim 16.

The Retailer terminal additionally is adapted to forward a proof that the amount of money is available on the bank account of the buyer and will be transferred from the bank account of the buyer to a bank account of the vendor, towards the vendor-terminal. This in order to notify the vendor that the transfer of the requested amount of money is confirmed and guaranteed in advance to the actual transfer of money as a period of time required for the actual transfer may be too long.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein:

BRIEF DESCRIPTION OF THE DRAWINGS

FIG. 2 represents the vendor terminal VT of the present invention as presented in FIG. 1.

FIG. 3 represents the retailer terminal RT of the present invention as presented in FIG. 1.

FIG. 4 represents the user terminal UT of the present invention as presented in FIG. 1.

FIG. 5 represents the delivery company terminal DCT of the present invention as presented in FIG. 1.

In the following paragraphs, referring to the drawings, an implementation of the payment method and the related user terminal, vendor terminal, delivery company terminal and retailer terminal according to the present invention will be described. In the first paragraph of this description the main elements of the communications network as presented in FIG. 1 are described. In the second paragraph, all connections between the before mentioned elements and described means are defined. Subsequently all relevant functional means of the mentioned vendor terminal, retailer terminal, user terminal, and delivery company terminal and as presented in the respective FIG. 2 to FIG. 5 are described followed by a description of all interconnections. In the succeeding paragraph the actual execution of the method for session establishment is described.

DETAILED DESCRIPTION

Figure 1:
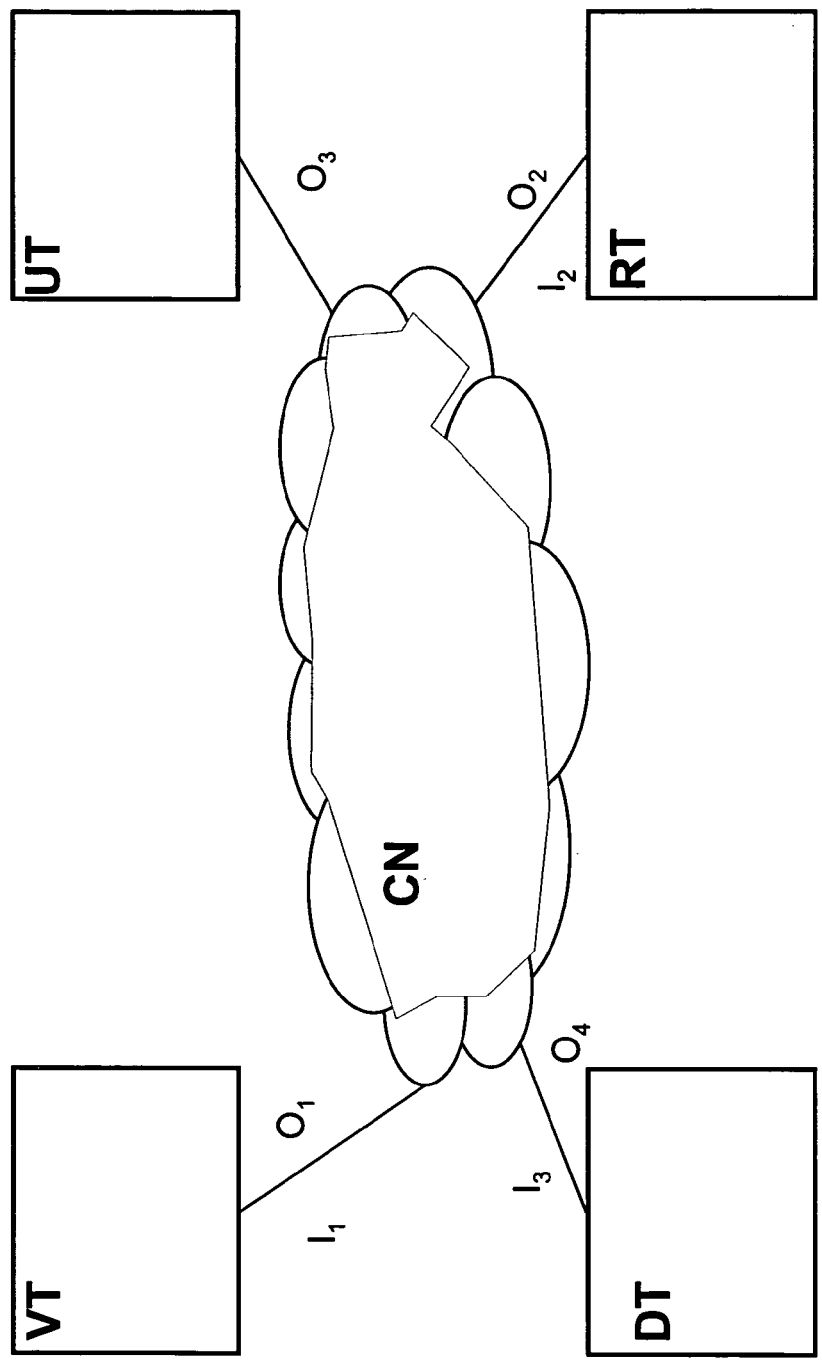
FIG. 1 represents an overview of the communications network and the devices implementing the payment method according to the present invention.

The main elements of the communications system are a communications network CN, which may be the Internet, and a vendor terminal, which may be a personal computer, located at the vendor-site and being coupled to a communications network CN, i.e. in this case the Internet via an always on connection, such as ADSL. The retailer terminal may also be a personal computer, located at the retailer-site and being coupled to the communications network Internet via an always on connection, such as ADSL. Furthermore this retailer terminal may have access to bank accounts of its clients. Then the user terminal may be an intelligent mobile terminal such as a Personal Digital Assistant being coupled to the communications network CN over a GPRS-airlink and the delivery company terminal may also be an intelligent mobile terminal such as a Personal Digital Assistant being coupled to the communications network CN over a GPRS-airlink.

The vendor terminal comprises an ordering request reception part ORRP that is adapted to receive a request for ordering a good forwarded by the user-terminal, a processing part PP that is adapted to generate, at reception of said request for ordering a good, a shipping order, for delivering the good to the buyer by a deliverer and a shipping order sending part SOSP that is able to send the shipping order to a delivery company-terminal of a deliverer. Furthermore, the vendor terminal VT comprises a confirmation reception part CRP that is adapted to receive an approval for payment created by said user, a payment request generating part PRGP that is adapted to generate a request for an amount of money required for paying said good from the bank account of said buyer based on the approval for payment forwarded towards the vendor terminal VT and a payment request sending part PRSP, that is able to send the request for an amount of money towards the retailer terminal RT. The vendor terminal VT further comprises a payment proof reception part PPRP that is adapted to receive a proof of payment created and forwarded by the retailer terminal RT and a payment proof processing part PPPP that is adapted to processes the proof of payment and subsequently forwards this proof of payment towards the delivery company terminal in order to notify the deliverer of the acceptance of the delivered goods and the correct payment.

The User terminal UT comprises an ordering request sending part ORSP that is adapted to send a request for ordering a good to the vendor-terminal VT, a confirmation creating part CCP that is adapted to confirm the acceptance of the goods delivered by the deliverer by creating an approval for payment and a confirmation forwarding part CFP that is adapted to forward the approval for payment towards the vendor terminal. The User terminal UT further comprises a reception part for receiving the confirmation of ordering the goods and a reception part for receiving the invoice from either the delivery company terminal DCT or the vendor terminal VT (both are not presented in the figures). Furthermore there is a delivery company-terminal DCT in use by a deliverer of a delivery company. This delivery company-terminal DCT includes a shipping order reception part SORP that is able to receive a shipping order from the vendor terminal VT, a confirmation reception part CRP that is adapted to receive an approval for payment from the user-terminal UT and the delivery company terminal may further comprise a confirmation processing and forwarding part CPFP that is adapted to process the approval for payment and to forward this approval for payment towards said vendor company terminal VT. The Delivery company-terminal additionally may comprise a notification reception part NRP that is adapted to receive a notification of payment of the goods by the user forwarded by the vendor-terminal. The delivery company terminal furthermore comprises a terminal presentation part TPP for presenting the incoming messages and notifications received.

Then the retailer terminal RT, first comprises a payment request reception part PRRP, that is adapted to receive an approval for payment from the user terminal for requesting an amount of money, required for paying the good, from the bank account of the buyer, forwarded by the vendor terminal. Secondly, the terminal RT comprises a payment part PP, that is adapted to transfer the amount of money from the bank account of the buyer to the bank account of the vendor in response to receipt of the approval for payment. The payment part PP of the retailer terminal RT is additionally adapted to forward a proof of transferring the amount of money from the bank account of the buyer to a bank account of the vendor, towards the vendor terminal VT.

The ordering request sending part ORSP of the user terminal UT has an output-terminal that is at the same time an output-terminal $O_3$ of the user terminal UT. The confirmation creating part CCP of the user terminal UT is coupled with an output to an input of the confirmation forwarding part CFP that in turn has an output-terminal that is at the same time an output-terminal $O_3$ of the user terminal UT.

The ordering request reception part ORRP of Vendor terminal VT has an input-terminal that is at the same time an input-terminal $I_1$ of the vendor terminal VT. The ordering request reception part ORRP further is coupled with an output to an input of the processing part PP that in turn is further coupled with an output to an input of the shipping order sending part SOSP. The shipping order sending part SOSP further has output-terminal that is at the same time an output-terminal $O_1$ of the vendor terminal VT.

The confirmation reception part CRP of vendor terminal VT has an input-terminal that is at the same time an input-terminal $I_1$ of the vendor terminal VT. The confirmation reception part CRP further is coupled with an output to an input of the payment request generating part PRGP that in turn is further coupled with an output to an input of the payment request sending part PRSP. The payment request sending part further has an output-terminal that is at the same time an output-terminal $O_1$ of the vendor terminal VT.

The payment proof reception part PPRP of vendor terminal VT has an input-terminal that is at the same time an input-terminal $I_1$ of the vendor terminal VT. The payment proof reception part PPRP further is coupled with an output to an input of the payment proof processing part PPPP that in turn has an output-terminal that is at the same time an output-terminal $O_1$ of the vendor terminal VT.

The shipping order reception part SORP of the Delivery company-terminal DCT has an input-terminal that is at the same time an input-terminal 13 of the delivery company terminal DCT. The shipping order reception part SORP further is coupled with an output to an input of the terminal presentation part TPP.

The confirmation reception part CRP of the Delivery company-terminal DCT has an input-terminal that is at the same time an input-terminal 13 of the delivery company terminal DCT. The confirmation reception part CRP further is coupled with an output to an input of the confirmation processing forwarding part CPFP that in turn has an output-terminal that is at the same time an output-terminal $O_4$ of the delivery company terminal DCT.

The notification reception part NRP of the Delivery company-terminal DCT has an input-terminal that is at the same time an input-terminal $I_3$ of the delivery company terminal DCT. The notification reception part NRP further is coupled with an output to an input of the terminal presentation part TPP.

The payment request reception part PRRP of the Retailer terminal RT has an input-terminal that is at the same time an input-terminal $I_2$ of the Retailer terminal RT. The payment request reception part PRRP further is coupled with an output to an input of the payment part PP that in turn has an output-terminal $O_2$ that is at the same time an output-terminal of the Retailer terminal RT.

In order to explain the operation of the present invention it is assumed that a potential buyer, in the following called the user, wants to buy a good seen at an Internet site maintained by a vendor. The user, in order to buy this good, then instructs his user terminal UT to send, by means of the ordering request sending part ORSP, a request for ordering a good to the vendor-terminal VT. The ordering request reception part ORRP of the vendor terminal VT receives this request for ordering the good that was forwarded by the user-terminal. The processing part PP of the vendor terminal VT subsequently generates, upon the reception of the request for ordering the good, a shipping order, for delivering the good to the buyer by a deliverer. This request then is forwarded to the shipping order sending part SOSP that sends the shipping order to a delivery company-terminal of a deliverer.

At this stage the vendor-terminal VT may send a confirmation of the request for ordering the good at reception of the request for ordering the good, towards the user-terminal UT.

Furthermore, the vendor terminal, at sending the shipping order to a delivery company-terminal, may additionally send an invoice towards the user terminal.

The shipping order reception part SORP of the delivery company-terminal DCT receives the shipping order from the vendor terminal VT and forwards this shipping order to the terminal presentation part TPP. The terminal presentation part TPP here is assumed to be the LCD display of the terminal that presents to the deliverer the request for delivery. Alternatively any other displaying means, such as e.g. a CRT display or a printer, are equally suitable. Further it is assumed that the deliverer with or without an appointment to deliver the good at the user's house, delivers the ordered good to the user.

Alternatively, the vendor terminal, at sending the shipping order to a delivery company-terminal, may send an invoice towards the delivery company-terminal, and the delivery company-terminal, at delivery of the goods, may send an invoice towards the user terminal.

Then it is assumed that the user is satisfied with the good the deliverer is delivering. Hence the user will, in order to confirm the acceptance of the goods delivered by the deliverer, instruct his user terminal via the keyboard of the terminal UT (not shown) to confirm the acceptance of the goods delivered by the deliverer by creating an approval for payment by means of the confirmation creating part CCP and subsequently by means of the confirmation forwarding part CFP forwarding the approval for payment towards the vendor terminal.

The approval for payment may be an acknowledged invoice created by acknowledging the received invoice.

The confirmation reception part CRP of the vendor terminal receives the approval for payment created by the user-terminal UT from the user-terminal UT and next the payment request generating part PRGP generates a request for the amount of money required for paying the good from the bank account of the buyer based on the approval for payment created by the user terminal. This request then is forwarded towards the retailer terminal RT by means of the payment request sending part PRSP.

Then the payment request reception part PRRP of the retailer terminal RT receives the approval for payment, from the user terminal, for requesting an amount of money, required for paying the good, from the user's bank account, forwarded by the vendor terminal. Subsequently, the payment part PP of the retailer terminal RT, in response to receipt of the approval for payment, transfers the amount of money from the user's bank account (the buyer) to the vendor's bank account. The payment part PP of the retailer terminal RT further may generate and forward a proof of the transfer of the amount of money from the user's bank account towards the vendor's bank account of the vendor, towards the vendor terminal VT. The payment proof reception part PPRP of the vendor terminal VT receives this proof created and forwarded by the retailer terminal RT and forwards this proof to the payment proof processing part PPPP that processes this proof of payment and subsequently forwards this proof of payment towards the delivery company terminal in order to notify the deliverer of the acceptance of the delivered goods and the correct payment. At reception of the proof of payment by the notification reception part NRP of the delivery company-terminal DCT the notification of payment of the ordered goods may be presented on the screen of the vendor-terminal. For the deliverer, this is a notification that he may leave the delivered good with the user because the good is accepted and payment is complete.

Alternatively the user-terminal may confirm the acceptance of the goods delivered by the deliverer by creating an approval for payment by means of the confirmation creating part CCP and subsequently by means of the confirmation forwarding part CFP forwarding the approval for payment towards the delivery company terminal. The confirmation reception part CRP of the delivery company terminal receives the approval for payment and forwards it to the confirmation processing and forwarding part CPFP that is adapted to process the approval for payment and to forward this approval for payment towards said vendor company terminal VT.

The delivery company terminal subsequently forwards this acceptance of the delivered goods and an approval for payment of the delivered goods towards the vendor terminal that in its turn forwards the message towards the retailer terminal for requesting the retailer to transfer money from the user's bank-account towards the vendor's bank account. The subsequent steps of the procedure are equal to the previously described scenario.

At reception of the confirmation of ordering the good by the user with the vendor, the user-terminal may request a retailer-terminal to provide a proof of sufficient credit available on the bank account of the user, whereupon the retailer-terminal may forward the proof of sufficient credit available required for paying the good, to the user-terminal UT and subsequently the user-terminal UT may forward the proof of credit available, to the vendor-terminal. Alternatively, the user-terminal may, at reception of the confirmation of ordering the good by the user with the vendor, request a retailer-terminal to provide the vendor-terminal with a proof of credit available on said bank account, required for paying said good whereupon the retailer-terminal may forward the proof of credit available to the vendor-terminal.

Alternatively, the vendor terminal VT may delay the sending of the shipping order to the delivery company terminal DCT until he receives a proof of credit available for the ordered goods from either the user terminal UT or the retailer terminal RT.

In case the user is not satisfied by the vendor because of long response time, a wrong or even damaged good is delivered or any other reason, the user may send a cancel signal based on the confirmation of the ordered goods forwarded by the vendor terminal, towards the vendor-terminal, that in turn forwards the cancel-signal towards the delivery company terminal DCT. The cancel signal at the delivery company terminal is interpreted and based hereon decided that the product must not be left with the user. If the cancel signal is sent towards the vendor-terminal before the shipping order is forwarded towards the delivery company terminal DCT, i.e. in case of a long response time, the order is cancelled by the vendor. Hence no shipping order needs to be forwarded anymore.

An additional remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

A further remark is that, instead of sending a complete invoice, the information sent can consist in a reference, such as a URL, pointing to a location where the complete invoice can be found, e.g. by using a standard browser using e.g. the HTTP protocol.

Still a further remark is that the technology used to exchange messages or information between the UT, RT, DCT, and VT, can be e.g. email, SMS, EMS, MMS, instant messaging, HTTP, or any standard available technology that allows to exchange information electronically.

An additional remark is that the technology used for the user to confirm an invoice and hence give the authorisation that the payment of the goods is performed, can be any standard technology available to that purpose, such as e.g. electronic signatures. For example the user can compute a fingerprint of the invoice using a special secret key. This way the retailer can verify that the fingerprint is authentic, and the fact that the vendor produces both the invoice and the fingerprint of the invoice is the proof that the user authorises the retailer to pay the vendor for the purchased goods.

The special secret key used by the user can be a private key that is part of a public/private key pair and that is such that any entity can verify that the fingerprint is authentic, and no entity other than the user is able to produce such a fingerprint.

Alternatively, the special secret key used by the user can be a secret key that is an exclusive shared secret between the user and the retailer and that is such that the retailer is the only entity, apart from the user, able to verify that the fingerprint is authentic, and no entity other than the user and the retailer are able to produce such a fingerprint.

A further remark is that, alternatively, the user may order the goods and receive the confirmation of ordering the goods with a first user terminal, and when ordering the goods, provide the necessary references in order to receive the invoice on a second user terminal with which the user wishes to create and forward the approval for payment. For example the first user terminal may be (but is not limited to) a Personal Computer with an ADSL access to the communications network CN, and the second user terminal may be (but is not limited to) a mobile GPRS telephone or a Personal Digital Assistant, with a GPRS-airlink to the communications network CN.

A final remark is that embodiments of the present invention are also described above in terms of events taking place between these functional blocks. Each of these events needs to be secured in order to resist accidental events or malicious actions that compromise the availability, authenticity, integrity and confidentiality of stored or transmitted data and the related services. Based on the descriptions in the embodiments and the knowledge of well-known security technologies, it will be apparent for a person skilled in the art of designing electronic devices how embodiments of these events can be secured with well-known security technologies. A detailed description of these security solutions hence is not given.

While the principles of the invention have been described above in connection with specific apparatus, it is to be clearly understood that this description is made only by way of example and not as a limitation on the scope of the invention, as defined in the appended claims.

The invention claimed is:

1. A payment method for paying goods electronically ordered at a vendor-terminal maintained by a vendor, by a buyer using a user-terminal, said buyer having a bank-account with a retailer, said method comprising:
   said user terminal sending a request for ordering goods to said vendor-terminal;
   said vendor-terminal sending a shipping order, for delivering said goods to said buyer, to a delivery company-terminal of a deliverer,
   said user-terminal confirming acceptance of said ordered goods delivered by said deliverer by creating an approval for payment destined to said vendor terminal and forwarding said approval towards said vendor terminal; and
   said vendor-terminal, upon reception of said approval for payment, requesting an amount of money required for paying said goods from said bank account of said buyer by forwarding said approval for payment towards said retailer terminal; and
   said retailer forwarding a proof of transferring said amount of money from said bank account of said buyer to a bank account of said vendor in response to receipt of said approval for payment; and
   said vendor terminal, upon reception of said proof of transferring said amount of money, notifying said delivery company terminal of acceptance of the goods.

2. The payment method according to claim 1, further comprising, said user terminal forwarding said approval for payment towards said vendor terminal via said delivery company terminal.

3. The payment method according to claim 1, further comprising, said vendor-terminal sending a confirmation of said request for ordering said goods at reception of said request for ordering said goods, towards said user-terminal.

4. The payment method according to claim 3, further comprising:
   at reception of said confirmation, said user-terminal requesting a retailer-terminal to provide said vendor-terminal with a proof of credit available on said bank account, required for paying said goods;
   said retailer-terminal forwarding said proof of credit available, to said user-terminal; and
   said user-terminal forwarding said proof of credit available, to said vendor-terminal.

5. The payment method according to claim 3, further comprising:
   at reception of said confirmation, said user-terminal requesting a retailer-terminal to provide said vendor-terminal with a proof of credit available on said bank account, required for paying said goods; and
   said retailer-terminal forwarding said proof of credit available, to said vendor-terminal.

6. The payment method according to claim 1, further comprising:
   said vendor terminal sending an invoice towards said delivery company-terminal; and
   said delivery company-terminal, at delivery of said goods, sending said invoice towards said user terminal.

7. The payment method according to claim 6, wherein said approval for payment is an acknowledged invoice created by acknowledging said invoice.

8. The payment method according to claim 1, further comprising, said vendor terminal, at sending said shipping order to a delivery company-terminal, additionally sending an invoice towards said user terminal.

9. A user terminal for use in a payment method for paying goods electronically ordered at a vendor-terminal maintained by a vendor, by a buyer using said user-terminal, said buyer having a bank-account with a retailer, said user terminal comprising:
   ordering request sending part, adapted to send a request for ordering goods to said vendor-terminal;
   confirmation creating part, adapted to confirm acceptance of said goods delivered by said deliverer by creating an approval for payment; and
   confirmation forwarding part, adapted to forward said approval for payment towards said vendor terminal.

10. The user terminal according to claim 9, wherein said confirmation forwarding part is further adapted to forwarding said approval for payment towards said vendor terminal via said delivery company terminal.

11. A vendor terminal for use in a payment method for paying goods electronically ordered at said vendor-terminal maintained by a vendor, by a buyer using a user-terminal, said buyer having a bank-account with a retailer, said vendor terminal comprising:
   an ordering request reception part, adapted to receive a request for ordering goods sent by said user-terminal;
   processing part, adapted to generate, at reception of said request for ordering said goods, a shipping order, for delivering said goods to said buyer by a deliverer;
   shipping order sending part, adapted to send said shipping order to a delivery company-terminal of a deliverer;
   confirmation reception part, adapted to receive an approval for payment created by said user;
   a payment request generating part, adapted to generate a request for an amount of money required for paying said goods from said bank account of said buyer based on said approval for payment to be forwarded towards said retailer terminal; and a payment request sending part, adapted to send said request for an amount of money towards said retailer terminal.

12. A delivery company-terminal of a deliverer, for use in a payment method for paying goods electronically ordered at a vendor-terminal- maintained by a vendor, by a buyer using a user-terminal, said buyer having a bank-account with said retailer, said delivery company-terminal comprising:

a shipping order reception part, adapted to receive a shipping order from said vendor terminal;

a confirmation reception part, adapted to receive an approval for payment from said user-terminal;

a confirmation processing forwarding part, adapted to process said approval for payment and to forward said approval for payment towards said vendor company terminal.

13. The delivery company-terminal according to claim 12, wherein said delivery company-terminal further comprises a notification reception part, adapted to receive a notification of acceptance of the goods by the user forwarded by the vendor terminal.

14. A delivery company-terminal for use in a payment method for paying goods electronically ordered at a vendor-terminal maintained by a vendor, by a buyer using a user-terminal, said buyer having a bank-account with said retailer, wherein said delivery company-terminal further comprises a notification reception part, adapted to receive a notification of acceptance of the goods by the user forwarded by the vendor terminal.

15. A retailer terminal, for use by a retailer in a payment method for paying goods electronically ordered at a vendor-terminal maintained by a vendor, by a buyer using a user-terminal, said buyer having a bank-account with said retailer, wherein said retailer terminal comprises:

payment request reception part, adapted to receive an approval for payment from said vendor terminal for requesting an amount of money required for paying said goods from said bank account of said buyer, from said retailer terminal; and a payment part, adapted to transfer said amount of money from said bank account of said buyer to a bank account of said vendor in response to receipt of said approval for payment.

16. The retailer terminal according to claim 15, wherein said payment part of said retailer additionally is adapted to forward a proof of transferring said amount of money from said bank account of said buyer to a bank account of said vendor, towards said vendor-terminal.

* * * * *